US007521106B2

(12) United States Patent
Risch et al.

(10) Patent No.: US 7,521,106 B2
(45) Date of Patent: Apr. 21, 2009

(54) INKS FOR USE ON OPTICAL RECORDING MEDIA

(75) Inventors: Brian Risch, Corvallis, OR (US); Michael J Day, Philomath, OR (US); Vladek P Kasperchik, Corvallis, OR (US); William Dorogy, Newburyport, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

(21) Appl. No.: 11/214,087

(22) Filed: Aug. 29, 2005

(65) Prior Publication Data

US 2007/0048487 A1 Mar. 1, 2007

(51) Int. Cl.
*B32B 3/02* (2006.01)
*B41M 5/337* (2006.01)

(52) U.S. Cl. .................. 428/64.4; 430/270.11; 503/206

(58) Field of Classification Search ....................... None
See application file for complete search history.

(56) References Cited

U.S. PATENT DOCUMENTS

| | | | | |
|---|---|---|---|---|
| 6,156,491 | A | 12/2000 | Goto | |
| 6,479,227 | B1 | 11/2002 | Kubo et al. | |
| 6,566,302 | B1 * | 5/2003 | Taylor et al. | 503/218 |
| 6,635,602 | B1 * | 10/2003 | Taylor et al. | 503/221 |
| 2005/0046692 | A1 | 3/2005 | Bronson | |

FOREIGN PATENT DOCUMENTS

WO WO 2005/062123 A 7/2005

* cited by examiner

*Primary Examiner*—Bruce H Hess

(57) ABSTRACT

An optical recording medium, comprises a substrate, an imaging composition disposed on said substrate, said compound comprising: a matrix, a color-forming agent, and a nucleating agent. The nucleating agent increases the nucleation density of at least one component of the color-forming agent.

17 Claims, 1 Drawing Sheet

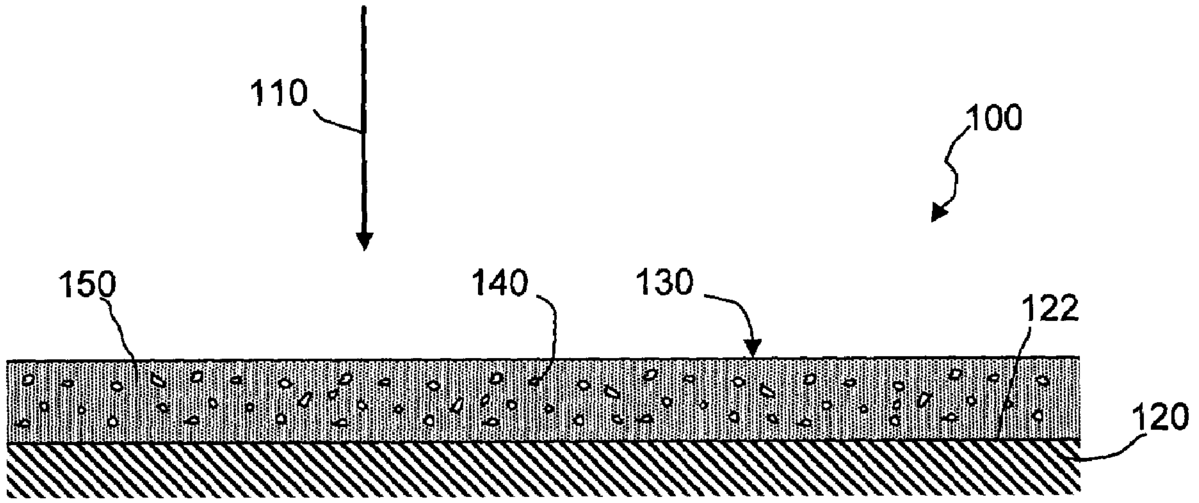
110
100
150
140
130
122
120

INKS FOR USE ON OPTICAL RECORDING MEDIA

BACKGROUND

Digital data are recorded on CDs, DVDs, and other optical media by using a laser to create pits in the surface of the medium. The data can then be read by a laser moving across them and detecting variations in the reflectivity of the surface. While this method is effective for creating machine-readable features on the optical medium, those features are not easily legible to the human eye.

Materials that produce color change upon stimulation with energy such as light or heat may be used to create human-readable images. For ease of discussion, such materials will be referred to herein as "thermochromic materials" (which change color by the action of heat) and that term as used herein is intended to encompass photochromic materials (which change color by the action of light). Leuco dyes are one kind of thermochromic material and are particularly well-suited to use with optical media because they can be activated with the same laser that is used to burn digital data onto the optical media, with the result that a single system can be used to produce both machine- and human-readable data on a CD, DVD, or other optical device.

One type of thermochromic coating that can be used with a laser is an ink comprising a leuco dye, a proton source (developer), and an ink vehicle. In many cases the ink vehicle may be a mixture of radiation curable monomers and oligomers (UV-curable lacquer). The developer can be a proton source such as highly acidic phenol or any other suitable proton source.

Leuco dyes in their crystalline form have relatively low solubilities in the lacquer. By contrast, the amorphous forms of many leuco dyes have significantly higher solubilities. The developer often has good solubility in the lacquer. Thus, during ink preparation: a) developer is dissolved in the lacquer and forms a relatively stable solution; and b) leuco dye in the amorphous form is dissolved in the lacquer and allowed to crystallize into its less soluble crystalline form. The resulting ink typically consists of 2 distinctive phases: 1) crystallized leuco dye; 2) lacquer phase with developer dissolved in it. Alternatively, pre-crystallized leuco dye may be added to the lacquer.

Ink formulated this way may be printed/coated as a thin coating (1-20 um) and cured into polymer matrix by electromagnetic radiation (typically UV). A color change in the ink coating can be brought about by raising its temperature. Upon heating, at least one phase of the coating melts and the dye molecules begin to come into contact with developer. Intimate contact of leuco dye and developer at high temperature results in proton transfer from developer to leuco dye and causes a color change of the latter. Rapid cooling of the system preserves the color change by preventing re-crystallization of the dye. Because the melted area is relatively small, the coating is relatively thin, and the coating is in contact with the significantly thicker substrate, sufficiently rapid cooling is not difficult to achieve.

Because the dye becomes visible only when it has been melted and dissolved in the matrix, and because rate of the color development is highly dependent on the leuco dye dissolution rate, smaller crystallite sizes of the leuco dye translate into faster dissolution and color formation rate. Thus, the size of the leuco dye crystals greatly affects the imaging sensitivity of the ink. If the crystals are too large, the available laser power will not be sufficient to bring about a satisfactory color change fast enough, resulting in diminished marking sensitivity. In addition, larger crystals result in increased light scattering, which reduces efficiency of imaging laser energy absorption as well as legibility of the desired marks.

Because the crystals that occur naturally if when a leuco dye is crystallize out of solution are much larger than is desirable, it is often necessary to add the dye in the form of pre-formed crystals that have been milled. Milling the crystals to achieve the desired particle size increases the cost and complexity of the ink-making process. Hence, it is desirable to provide a method for using leuco dyes that avoids these deficiencies of known systems.

BRIEF SUMMARY

An optical recording medium comprises a substrate, an imaging composition disposed on said substrate. The imaging compound comprises: a matrix, a color-forming agent, and a nucleating agent. The nucleating agent increases the nucleation density of at least one component of the color-forming agent.

BRIEF DESCRIPTION OF THE DRAWINGS

For a detailed description of exemplary embodiments of the invention, reference will now be made to the accompanying drawing, which shows an imaging medium according to an embodiment of the present invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

As mentioned above, the term "thermochromic" includes photochromic materials and is used herein to describe a chemical, material, or device that changes from one color to another, or from a colorless state to a colored state, as discerned by the human eye, when it undergoes a change in temperature.

The term "leuco dye" is used to refer to a color forming substance that is colorless or one color in a non-activated state and produces or changes color in an activated state. As used herein, the terms "developer" and "activator" describe a substance that reacts with the dye and causes the dye to alter its chemical structure and change or acquire color.

As used herein, the terms "nucleating agent," "nucleation agent," and "nucleator" all refer to substances that, when added to a mixture or solution, increase the nucleation density of crystal or polymer grains that form when one or more components of the mixture or solution precipitate or crystallize from the liquid phase.

As used in the context of a nucleating agent, as discussed in detail below, "heterogeneous" refers to a compound that has a composition or a crystal structure that is different from the composition or crystal structure of the compound whose nucleation is desired.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring briefly to the drawing, there is shown an imaging medium 100 and energy beam 110. Imaging medium 100 may comprise substrate 120 and imaging composition 130 on a surface 122 thereof. Imaging composition 130 in turn includes a matrix 150 and suspended particles 140. Substrate 120 may be any substrate upon which it is desirable to make a mark, such as, by way of example only, paper (e.g., labels, tickets, receipts, or stationary), overhead transparencies, or the labeling surface of a medium such as a CD-R/RW/ROM or DVD±R/RW/ROM. Imaging composition 130 may be applied to the substrate via any acceptable method, such as, by way of example only, rolling, spin-coating, spraying, or screen printing.

As described in detail below, matrix 150 may comprise a matrix material, an optional fixing agent, an optional radiation-absorbing compound such as a dye, and a color-forming agent. The color-forming agent may be any substance that undergoes a human-detectable optical change in response to a threshold stimulus, which may be applied in the form of light, heat, or pressure. In some embodiments, the color-forming agent may comprise a leuco dye and a developer. The developer and the leuco dye, when mixed, may change color. Either of the developer and the leuco dye may be soluble in the matrix. The other component (developer or leuco dye) may be substantially insoluble in the matrix and is suspended in the matrix as distributed particles 140. The optional fixing agent may be completely dissolved in the matrix phase or may be present as finely ground powder dispersed in the matrix phase.

Energy 110 may be directed imagewise to imaging medium 100. The form of energy may vary depending upon the equipment available, ambient conditions, and desired result. Examples of energy that may be used include but are not limited to IR radiation, UV radiation, x-rays, or visible light. The antenna may absorb the energy and heat the imaging composition 130. The heat may cause suspended particles 140 to reach a temperature sufficient to cause the interdiffusion of the color forming species initially present in the particles (e.g., glass transition temperatures (Tg) or melting temperatures (Tm) of particles 140 and matrix).

Performance of thermochromic inks that are formulated this way may be enhanced by providing a heterogeneous nucleating agent with the color-forming agent.

Because marking sensitivity of the resulting coating is highly dependent on the surface area of the crystalline phase in the coating, it is advantageous for the crystalline phase to have smaller final particle sizes. As mentioned above, leuco dyes used in the ink formulations may be provided in either an amorphous or crystalline state. Solubility of the crystalline state in the matrix phase is typically low at ambient temperatures. If the leuco dye is provided in the crystalline phase, it is desirable to provide crystals that are as small as practically possible. In contrast, solubility of amorphous state in the matrix phase may be quite high. As a result, the amorphous phase of the leuco-dye tends to dissolve when it is initially added to the lacquer and then precipitate as crystalline phase. If there are no other factors influencing crystallization, the dye tends to crystallize out of the solution relatively slowly, producing crystals that are larger than is desirable. It has been discovered that the addition of one or more heterogeneous nucleating agents to the dye solution will greatly increase the number of nucleation sites, thereby desirably reducing the size of the resulting crystals.

The heterogeneous nucleating agent can be any substance that increases the nucleation density of the color-forming agent. The nucleating agent can act via chemical, mechanical, or other pathways to limit the size of crystal growth. By increasing the nucleation density of the color-forming agent, the nucleation agent decreases the threshold power level at which said color-forming means undergoes a human-detectable optical change.

Exemplary nucleating agents have chemical formulas such as

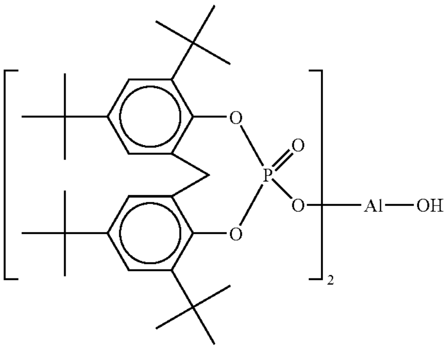

aluminum, hydroxybis[2,4,8,10-tetrakis-(1,1-dimethylethyl)-6-hydroxy-12H-dibenzo[d,g][1,2,3]dioxaphoshocin 6-oxidato]. or

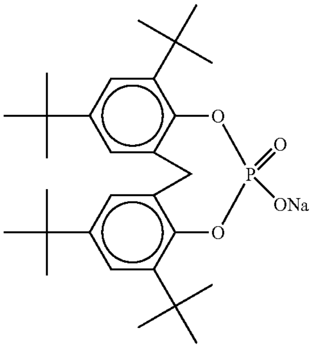

methylenebis-[4,6-di-tert-butyl-phenyl] phosphate sodium salt, nucleating agents include but are not limited to Group IA and IIA metal salts of monocarboxylic acids (for example, sodium benzoate), Group III-IV metal salts of dicarboxylic acids (adipic acid) and aliphatic dicarboxylic acids (for example, aluminum p-t-butylbenzoate), sodium 2,2'-methylene-bis-(4,6-di-tert-butylphenyl)phosphate (available from Asahi Denka Kogyo K.K. under the trade name NA-11), aluminum bis[2,2'-methylene-bis-(4,6-di-tert-butylphenyl)-phosphate] (also from Asahi Denka Kogyo K. K. under the trade name NA-21), salts of hexahydrophthalic acid (HHPA) including calcium, strontium, monobasic aluminum, and lithium HHPA salts, nucleating agents such as those available from Milliken Chemical under the names Hyperform 68 and Hyperform 68L, and the like and may include various additives, including 13-docosenamide and amorphous silicon dioxide.

In certain embodiments, the nucleating agent may comprise a salt of an aliphatic monobasic acid, a salt of an aliphatic dibasic acid, a salt of an arylakyl acid, or a dibenzylidene sorbitol derivative, including one or more of 1,3-O-2,4-bis(3,4-dimethylbenzylidene) sorbitol, 1,3,2,4-dibenzylidene sorbitol, 1,3,2,4-di-(p-methylbenzylidene) sorbitol, 1,3,2,4-di-(p-ethylbenzylidene) sorbitol, 1,3,2,4-di-(p-chlorbenzylidene)sorbitol, 1,3-p-chlorbenzylidene-2,4,-p-methylbenzylidene sorbitol, sodium-bis-(4-t-butylphenyl) phosphate, sodium-2,2-methylene-bis-(4,4-di-t-butylphenyl)phosphate, sodium-2-2'-ethylidene-bis-(4,6-di-t-butylphenyl)phosphate.

In other embodiments, the nucleating agent may be sodium succinate, sodium gluterate, or sodium caproate, sodium benzoate, sodium stearate, or potassium benzoate. In still other embodiments, the nucleating agent may comprise materials such as talc, calcium carbonate, carbon black, mica, silica, titania, other metal oxides, or kaolin. In still other embodiments the nucleating agent may comprise organophosphate salts, phosphate esters, or norbornane carboxylic acid salts.

In still other embodiments, the nucleating agent comprises seed crystals of dye material. In these embodiments, the seed crystals comprise crystalline particles of the same or a different dye material as that used as the color-forming agent, and may have an average size much smaller than 1 micron. These can be manufactured or purchased and can be added to the dye or to the ink mixture before or after it is applied to the substrate. In alternative embodiments, a desired crystal structure can be obtained by providing the dye in an amorphous form and annealing it such that microscopic crystals begin to form. Because the crystalline form of some dyes does not dissolve as readily as the amorphous form, the crystals produced in this manner can function as nucleation points when the amorphous portions of the dye dissolve and then recrystallize.

Some nucleating agents also improve the optical transparency of the matrix. In some embodiments this may be an advantage; in other embodiments the nucleating agent may not affect the optical transparency of the matrix or the optical transparency of the matrix may have little effect on the operability of the system.

In certain embodiments, the nucleating agent is provided in an amount sufficient to produce dye crystals having an average diameter of less than 5 μm. In other embodiments, the average diameter is less than 2 μm or less than 1 μm or even substantially less than 0.5 μm. Additionally or alternatively, in certain embodiments at least 50% of the dye crystals have a greatest dimension that is smaller than 1 μm. In other embodiments, at least 80% or at least 90% of the dye crystals have a greatest dimension that is smaller than 1 μm or smaller than 0.5 μm.

If the color-forming agent is photochromic or thermochromic without a developer, the nucleating agent can be used to increase the nucleation density of the color-forming agent in the matrix.

When the color-forming agent comprises both a color former and a developer, one or both of the developer and the dye may be soluble in the matrix at ambient conditions. The other may be substantially insoluble in the matrix at ambient conditions. By "substantially insoluble," it is meant that the solubility of that component of the color-forming agent in the lacquer at ambient conditions is so low, that no or very little color change may occur due to reaction of the dye and the developer at ambient conditions. Although, as in the embodiments described above, the developer may be dissolved in the matrix with the dye being present as small crystals suspended in the matrix at ambient conditions, in other embodiments the color former may be dissolved in the matrix and the developer may be present as small crystals suspended in the matrix at ambient conditions.

Color formers may include, but are not limited to, leuco dyes such as fluoran leuco dyes and phthalide color formers as described in "The Chemistry and Applications of Leuco Dyes," Muthyala, Ramiah, ed., Plenum Press (1997) (ISBN 0-30645459-9). Embodiments may include almost any known leuco dye, including, but not limited to, fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)-4,5-diphenylimidazoles, phenethylanilines, and mixtures thereof. In other embodiments, the leuco dye may comprise a fluoran, phthalide, aminotriarylmethane, or mixtures thereof.

Particularly suitable leuco dyes include:

2'-Anilino-3'-methyl-6'-(dibutylamino)-fluoran

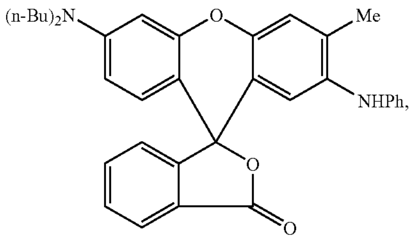

2-Anilino-3-methyl-6-(N-ethyl-N-isoamylamino) fluoran

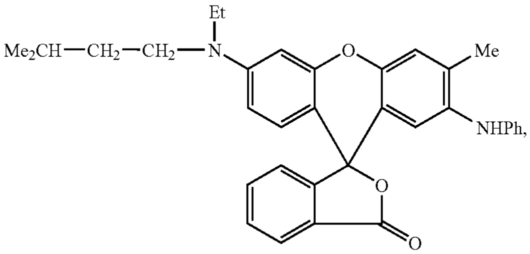

and

2-Anilino-3-methyl-6-(di-n-amylamino)fluoran

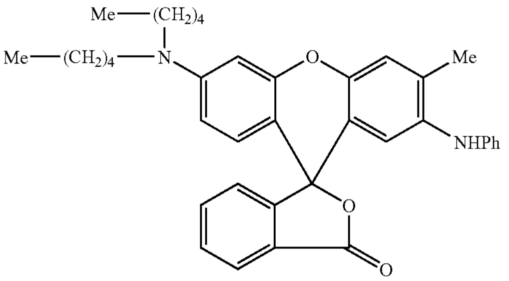

All three dyes are commercially available from Nagase Co of Japan.

Several non-limiting examples of suitable fluoran based leuco dyes may include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino) fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino) fluorane 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone, 4,5,6,7-tetrachloro-3,3-bis [2-[4-(dimethylamino)phenyl]-2-(4-methoxyphenyl)ethenyl], and mixtures thereof. Aminotriarylmethane leuco dyes may also be used in the present invention such as tris(N,N-dimethylaminophenyl) methane (LCV); deutero-tris(N,N-dimethylaminophenyl) methane (D-LCV); tris(N,N-diethylaminophenyl)methane (LECV); deutero-tris(4-diethylaminophenyl)methane (D-LECV); tris(N,N-di-n-propylaminophenyl)methane (LPCV); tris(N,N-din-butylaminophenyl)methane (LBCV); bis(4-diethylaminophenyl)-(4-diethylamino-2-methyl-phenyl)methane (LV-1); bis(4-diethylamino-2-methylphenyl)-(4-diethylamino-phenyl)methane (LV-2); tris(4-diethylamino-2-methylphenyl)methane (LV-3); deutero-bis(4-diethylaminophenyl)-(4-diethylamino-2-methylphenyl) methane (D-LV-1); deutero-bis(4-diethylamino-2-methylphenyl)(4-diethylaminophenyl)methane (D-LV-2); bis(4-diethylamino-2-methylphenyl)(3,4-diemethoxyphenyl)methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl.

Developers may include, without limitation, proton donors, for example acidic phenolic compounds such as bisphenol-A, bisphenol-S, p-hydroxy benzyl benzoate, TG-SA (phenol, 4,4'-sulfonylbis[2-(2-propenyl)]) and poly-phenols.

The leuco dye may also be present as a separate phase in the form of a low-melting eutectic. The eutectic may comprise an alloy of fluoran dye and a melting aid. Melting aids, also referred to as "accelerators," may include crystalline organic solids with melting temperatures in the range of about 50° C. to about 150° C., and alternatively melting temperature in the range of about 70° C. to about 120° C. Suitable accelerators may include aromatic hydrocarbons (or their derivatives) that provide good solvent characteristics for leuco dye. The melting aid may assist in reducing the melting temperature of the leuco dye and stabilize the leuco dye alloy in the amorphous state (or slow the recrystallization of the leuco dye alloy into individual components). Suitable melting aids for use in the current invention may include, but are not limited to, m-terphenyl, p-benzyl biphenyl, y-naphtol benzylether, and 1,2[bis (3,4]dimethylphenyl)ethane. Other species that may stabilize amorphous phase in leuco dye melts include polymeric species such as acrylate or methacrylate polymers or co-polymers. More generally, any polymeric species soluble in hot leuco dye melt has the potential to act as an amorphous phase stabilizer.

Regardless of the nature of the color-forming agent, an absorber or antenna that is tuned to a desired frequency may be included in the ink so as to increase absorbance of the available light energy. In some embodiments, the absorber or antenna is tuned to the frequency of the laser that will be used to create the desired marks. By effectively absorbing the available light, the absorber or antenna increase the heating effect of the laser, thereby enhancing the thermochromic response.

The matrix material may be any composition suitable for dissolving and/or dispersing the developer, and color former (or color former/melting aid alloy). Acceptable matrix materials may include, by way of example only, UV curable matrices such as acrylate derivatives, oligomers and monomers, with a photo package. A photo package may include a light absorbing species which initiates reactions for curing of a matrix, such as, by way of example, benzophenone derivatives. Other examples of photoinitiators for free radical polymerization monomers and pre-polymers include but are not limited to: thioxanethone derivatives, anthraquinone derivatives, acetophenones and benzoine ether types. It may be desirable to choose a matrix that can be cured by a form of radiation other than the type of radiation that causes a color change.

Matrices based on cationic polymerization resins may require photo-initiators based on aromatic diazonium salts, aromatic halonium salts, aromatic sulfonium salts and metallocene compounds. An example of an acceptable matrix or matrix may include Nor-Cote CLCDG-1250A or Nor-Cote CDG000 (mixtures of UV curable acrylate monomers and oligomers), which contains a photoinitiator (hydroxy ketone) and organic solvent acrylates (e.g., methyl methacrylate, hexyl methacrylate, beta-phenoxy ethyl acrylate, and hexamethylene acrylate). Other acceptable matrixs or matrices may include acrylated polyester oligomers such as CN292, CN293, CN294, SR351 (trimethylolpropane tri acrylate), SR395 (isodecyl acrylate), and SR256 (2(2-ethoxyethoxy) ethyl acrylate) available from Sartomer Co.

The imaging compositions formed in the manner described herein can be applied to the surface of an optical recording medium such as a CD, DVD, or the like. When the color-forming agent, optional antenna, and other components are selected appropriately, the same laser that is used to "write" the machine-readable data onto the optical recording medium can also be used to "write" human-readable images, including text and non-text images, onto the medium.

In certain embodiments, the machine-readable layers are applied to one surface of the optical recording medium and the present imaging compositions are applied to the opposite surface of the optical recording medium. In these embodiments, the user can remove the disc or medium from the write drive after the first writing process, turn it over, and re-insert it in the write drive for the second writing process, or the write drive can be provided with two write heads, which address opposite sides of the medium. Alternatively, separate portions of one side of the optical recording medium can be designated for each of the machine- and human-readable images.

Thus, embodiments of the present invention are applicable in systems comprising a processor, a laser coupled to the processor, and a data storage medium including a substrate having a first surface that can be marked with machine-readable marks by said laser and a second surface that can be marked with human-readable marks by said laser. The second surface includes an imaging composition in accordance with the invention, comprising a color-forming agent; and a heterogeneous nucleating agent that increases the nucleation density of at least one component of the color-forming agent.

The above discussion is meant to be illustrative of the principles and various embodiments of the present invention. Numerous variations and modifications will become apparent to those skilled in the art once the above disclosure is fully appreciated. For example, the composition and relative amount of the matrix, color-forming agent, nucleating agent, developer, if any, and photoabsorber, if any, can all be varied. It is intended that the following claims be interpreted to embrace all such variations and modifications. Similarly, unless explicitly so stated, the sequential recitation of steps in any claim is not intended to require that the steps be performed sequentially or that any step be completed before commencement of another step.

What is claimed is:

1. An optical recording medium, comprising:

a substrate, an imaging composition disposed on said substrate, said composition comprising:

a ultraviolet curable matrix;

a a leuco dye and a developer, wherein one of the leuco dye and the developer is substantially insoluble in the matrix and the other of the leuco dye and the developer is soluble in the matrix; and a nucleating agent that increases the nucleation density in said imaging composition of the leuco dye.

2. The optical recording medium of claim 1 wherein said nucleating agent is selected from the group consisting of: Group IA and IIA metal salts of monocarboxylic acids, Group III-IV metal salts of dicarboxylic acids, aliphatic dicarboxylic acids, sodium 2,2'-methylene-bis-(4,6-di-tert-butylphenyl)phosphate, aluminum bis[2,2'-methylene-bis-(4,6-di-tert-butylphenyl)-phosphate], salts of hexahydrophthalic acid (HHPA), salts of aliphatic monobasic acids, salts of aliphatic dibasic acids, salts of arylakyl acids and combinations thereof.

3. The optical recording medium of claim 1 wherein said nucleating agent is selected from the group consisting of: 1,3-O-2,4-bis(3,4-dimethylbenzylidene) sorbitol, 1,3,2,4-dibenzylidene sorbitol, 1,3,2,4-di-(p-methylbenzylidene) sorbitol, 1,3,2,4-di-(p-ethylbenzylidene) sorbitol, 1,3,2,4-di-(p-chlorbenzylidene) sorbitol, 1,3-p-chlorbenzylidene-2,4,-p-methylbenzylidene sorbitol, sodium-bis-(4-t-butylphenyl) phosphate, sodium-2,2-methylene -bis-(4,4-di-t-butylphenyl)phosphate, sodium-2-2'-ethylidene-bis-(4,6-di-t-butylphenyl) phosphate and combinations thereof.

4. The optical recording medium of claim 1 wherein said nucleating agent is selected from the group consisting of: sodium succinate, sodium gluterate, sodium caproate, sodium benzoate, sodium stearate, potassium benzoate, and combinations thereof.

5. The optical recording medium of claim 1 wherein said nucleating agent is selected from the group consisting of: talc, calcium carbonate, carbon black, mica, silica, titania, metal oxides, kaolin and combinations thereof.

6. The optical recording medium of claim 1 wherein said nucleating agent is selected from the group consisting of: organophosphate salts, phosphate esters, or norbornane carboxylic acid salts.

7. The optical recording medium of claim 1 wherein the leuco dye is substantially insoluble in the matrix, wherein the nucleating agent is present in an amount sufficient to produce leuco dye crystals having an average diameter of less than 1 micron.

8. The optical recording medium of claim 1 wherein the leuco dye is substantially insoluble in the matrix, and wherein the nucleating agent is present in an amount sufficient to produce leuco dye crystals having an average diameter of less than 0.5 microns.

9. The optical recording medium of claim 1 wherein the leuco dye is present in the imaging composition as particles of which at least 80% have a greatest dimension that is smaller than 1 micron.

10. The optical recording medium of claim 1 wherein the imaging composition further includes a melting aid.

11. A means for providing human-readable and machine-readable marks on an optical recording medium, comprising:

first means for recording machine-readable marks on said medium in response to an optical signal;

second means for recording human-readable marks on said medium, said second means including a ultraviolet curable matrix, a leuco dye and a developer, wherein the leuco dye is substantially insoluble in the matrix and the developer is soluble in the matrix to produce a human-detectable optical change in response to an optical signal above a threshold power level and a nucleating agent for decreasing the threshold power level of said leuco dye and a developer by decreasing the particle size of the leuco dye.

12. The marking means of claim 11 wherein said nucleating agent increases the nucleation density of at least one component of the color-forming means.

13. A system, comprising:

a processor, a laser coupled to said processor;

a data storage medium including a substrate having a first surface that can be marked with machine-readable marks by said laser and a second surface that can be marked with human-readable marks by said laser, said second surface including an imaging composition comprising:

a ultraviolet curable matrix and a leuco dye and a developer, wherein one of the leuco dye and the developer is substantially insoluble in the matrix and the other of the leuco dye and the developer is soluble in the matrix; and a nucleating agent that increases the nucleation density of the leuco dye.

14. The system of claim 13 wherein the leuco dye is substantially insoluble in the matrix, wherein the nucleating agent is present in an amount sufficient to produce leuco dye crystals having an average diameter of less than 3 microns.

15. The system of claim 13 wherein the leuco dye is substantially insoluble in the matrix, wherein the nucleating agent is present in an amount sufficient to produce leuco dye crystals having an average diameter of less than 1 micron.

16. The system of claim 13 wherein the leuco dye is present in the imaging composition as particles of which at least 80% have a greatest dimension that is smaller than 1 micron.

17. The system of claim 13 wherein the imaging composition further includes a melting aid.

* * * * *